US008490717B2

(12) United States Patent
Bergstrom et al.

(10) Patent No.: US 8,490,717 B2
(45) Date of Patent: Jul. 23, 2013

(54) DOWNHOLE MAGNETIC MEASUREMENT WHILE ROTATING AND METHODS OF USE

(75) Inventors: Neil W. Smith Bergstrom, Englewood, CO (US); James N. Towle, Seattle, WA (US); Matthew A. White, Templeton, CA (US)

(73) Assignee: Scientific Drilling International, Inc., Houston, TX (US)

( * ) Notice: Subject to any disclaimer, the term of this patent is extended or adjusted under 35 U.S.C. 154(b) by 508 days.

(21) Appl. No.: 12/475,927

(22) Filed: Jun. 1, 2009

(65) Prior Publication Data

US 2010/0300756 A1    Dec. 2, 2010

(51) Int. Cl.
*E21B 47/00*    (2012.01)
(52) U.S. Cl.
USPC ............................................. 175/40; 324/346
(58) Field of Classification Search
USPC ........ 175/40, 41, 50; 324/333, 338, 345–346, 324/355–357, 366, 369; 33/304, 308, 310, 33/313, 316–321; 702/6, 7, 10, 141, 150–154
See application file for complete search history.

(56) References Cited

U.S. PATENT DOCUMENTS

| | | | |
|---|---|---|---|
| 2,485,931 A | | 10/1949 | Slonczewski |
| 4,894,923 A | * | 1/1990 | Cobern et al. .................. 33/304 |
| 5,012,412 A | | 4/1991 | Helm |
| 5,134,369 A | * | 7/1992 | Lo et al. ......................... 324/245 |
| 5,155,916 A | | 10/1992 | Engebretson |
| 5,230,387 A | * | 7/1993 | Waters et al. .................... 175/45 |
| 5,564,193 A | * | 10/1996 | Brooks ............................ 33/302 |
| 6,150,810 A | * | 11/2000 | Roybal ........................... 324/244 |
| 6,633,816 B2 | | 10/2003 | Shirasaka et al. |
| 7,195,062 B2 | * | 3/2007 | Cairns et al. ............... 166/255.2 |
| 7,219,749 B2 | * | 5/2007 | Kuckes ............................ 175/45 |
| 2004/0222019 A1 | | 11/2004 | Estes et al. |
| 2006/0272859 A1 | * | 12/2006 | Pastusek et al. ................. 175/40 |
| 2007/0203651 A1 | * | 8/2007 | Blanz et al. ....................... 702/6 |
| 2009/0128138 A1 | * | 5/2009 | Cuevas et al. ............ 324/207.21 |
| 2010/0100329 A1 | * | 4/2010 | Ekseth et al. ..................... 702/7 |

FOREIGN PATENT DOCUMENTS

WO    WO 2006/047523 A1    5/2006

OTHER PUBLICATIONS

Pratt, C.K. "A Magnetostatic Well Tracking Technique for Drilling of Horizontal Parallel Wells"—SPE 28319—Copyright 1994.*
Robinson, J.D. et al. "Magnetostatic Methods for Estimating Distance and direction from a Relief Well to a Cased Wellbore"—SPE—AIME—Jun. 1972.*
de Lange, John I. et al. "Improved Detectability of Blowing Wells" SPE—Mar. 1990.*

\* cited by examiner

*Primary Examiner* — John Kreck
(74) *Attorney, Agent, or Firm* — Adolph Locklar

(57) ABSTRACT

Downhole magnetic measurement devices and methods are provided for estimation of magnetic fields during drilling. In certain embodiments, a triaxial vector magnetometer is provided and affixed to a drill string subassembly. While the drill string subassembly is rotating, as during drilling operations, an average total magnetic field value ($B_{TwR}$) is determined as an average of the instantaneous vector magnitudes of the three measured orthogonal component magnetic fields. In this way, near-bit estimates of the downhole magnetic field may be obtained and used for a variety of functions. These downhole magnetic measurement devices may be useful determining magnetic fields, and estimating borehole inclination and azimuth of drill string subassemblies during drilling operations. Additionally, downhole magnetic measurement devices may be used for detecting the presence and distance to external ferromagnetic materials. In this way, these devices may be used for various applications, including, well avoidance, well intercept, and verification of instrument integrity.

20 Claims, 3 Drawing Sheets

DOWNHOLE MAGNETIC MEASUREMENT WHILE ROTATING AND METHODS OF USE

BACKGROUND

The present invention relates to downhole magnetic measurement devices and methods, which are capable of being used during drilling. Downhole magnetic measurement devices may be useful for determining downhole tool orientation, well avoidance, well intercept, and verification of instrument integrity.

Accurately and precisely determining the position and orientation of a drilling assembly during drilling operations is desirable, particularly when drilling deviated wells. Traditionally, a combination of sensors are used to measure downhole trajectory and subterranean conditions. Data collected in this fashion is usually transmitted to the surface via MWD-telemetry known in the art so as to communicate this trajectory information to the surface. Many factors may combine to unpredictably influence the trajectory of a drilled borehole. It is important to accurately determine the borehole trajectory to determine the position of the borehole at any given point of interest and to guide the borehole to its geological objective. Additionally, while drilling, it is often desired to avoid collisions with other undesired objects, geological features, wells, or zones. In other cases, it is desired to intercept other desirable objects, geological features, wells, or zones. Therefore, being able to predict the presence of such features is desirable from a collision avoidance or intercept standpoint.

In some instances, surveying of a borehole using conventional methods involves the periodic measurement of the Earth's magnetic and gravitational fields to determine the azimuth and inclination of the borehole at the bottom hole assembly. Historically, this determination has been made while the bottom hole assembly is stationary as these measurements are highly influenced by rotation of the bottom hole assembly. These "static" measurements are generally performed at discrete survey "stations" along the borehole when drilling operations are suspended such as when making up additional joints or stands of drillpipe into the drillstring. Consequently, the along-hole depth or borehole distance between discrete survey stations is generally from 30 to 60 to 90 feet or more, corresponding to the length of joints or stands of drillpipe added at the surface. While there were several reasons for taking measurement-while-drilling (MWD) measurements only in the absence of drillstring rotation, a principal reason for doing so is that the sensor arrays commonly used for measurement of the drillstring's azimuth and inclination (e.g., triaxial accelerometer and magnetometer sensor arrays) yield the most reliable sensor outputs only when the drill string is stationary.

Thus, certain conventional approaches for borehole surveying take certain borehole parameter readings or surveys only when the drill string is not rotating. One undesirable consequence of this conventional approach of taking magnetometer sensor readings only in the absence of drill string rotation is that no magnetometer sensor readings are available during drilling, which can often last up to 30 to 90 feet or more. Accordingly, during the period of drilling a section of pipe, the drilling is performed without the benefit of real-time magnetometer measurements. Alternatively, drilling may be temporarily stopped to allow magnetometer measurements, but this approach results in significant loss of time, producing significant drilling delays.

There are, however, circumstances where it is particularly desirable to be able to measure azimuth and inclination while the drill string is rotating. Examples of such circumstances include, but are not limited to, (a) wells where drilling is particularly difficult and any interruption in rotation may increase drill string sticking problems, and (b) situations where knowledge of azimuth is desired to predict the real time path of the borehole.

Attempts have been made to measure the magnetic field during drill string rotation, mainly through mathematical compensation or interpolation techniques. These conventional methods, however, suffer from a number of disadvantages, namely inaccuracies, which often compound over time, resulting in some cases, wildly inaccurate and imprecise data. Thus, conventional methods suffer from an inability to detect and account for borehole deviations that occur between survey stations and/or suffer from a variety of inaccuracies and imprecision. Accordingly, improved downhole magnetic measurement devices and methods are needed to address one or more of the disadvantages of the prior art.

SUMMARY

The present invention relates to downhole magnetic measurement devices and methods, which are capable of being used during drilling. Downhole magnetic measurement devices may be useful for determining downhole tool orientation, well avoidance, well intercept, and verification of instrument integrity.

One example of a method for determining an average total magnetic field value during drilling comprises: providing a triaxial vector magnetometer affixed to a drill string subassembly wherein the triaxial vector magnetometer is adapted to measure three orthogonal component magnetic fields; allowing the drill string subassembly to rotate; and determining the average total magnetic field value ($B_{TwR}$) as an average magnitude of the instantaneous vector sum of the three orthogonal component magnetic fields during the step of allowing the drill string subassembly to rotate.

One example of a method for detecting a presence of external ferromagnetic material comprises providing a triaxial vector magnetometer affixed to a drill string subassembly wherein the triaxial magnetometer is adapted to measure three orthogonal component magnetic fields; allowing the drill string subassembly to rotate; drilling a section of borehole; determining a plurality of average total magnetic fields along the section of borehole wherein the average total magnetic fields is as an average of the instantaneous vector magnitudes of the three orthogonal component magnetic fields during the step of allowing the drill string subassembly to rotate; and identifying the presence of external ferromagnetic material as a portion of the section where the average total magnetic fields vary from an expected Earth's magnetic field.

One example of a method for assessing the operational quality of downhole instrumentation comprises: providing a triaxial vector magnetometer affixed to a drill string subassembly wherein the triaxial vector magnetometer is adapted to measure three orthogonal component magnetic fields; allowing the drill string subassembly to rotate; determining an average total magnetic field ($B_{TwR}$) as an average of the instantaneous vector magnitudes of the three orthogonal component magnetic fields during the step of allowing the drill string subassembly to rotate; ceasing temporarily rotation of the drill string subassembly; measuring a stationary total magnetic field while the drill string subassembly is stationary so as to produce a stationary total magnetic field measurement; and comparing the average total magnetic field ($B_{TwR}$) to the stationary total magnetic field measurement so as to determine a magnitude of error between the total magnetic field ($B_{TwR}$) and the stationary total magnetic field measurement.

One example of a device for determining an average total magnetic field value during drilling comprises: a drill string subassembly; a processor; a first vector magnetometer wherein the first vector magnetometer corresponds to an along-borehole axis wherein the first vector magnetometer is adapted to measure a first vector magnetic field component, the first vector magnetometer having an output communicatively coupled to the processor; a second vector magnetometer wherein the second vector magnetometer corresponds to an cross-borehole axis wherein the second vector magnetometer is adapted to measure a second vector magnetic field component, the second vector magnetometer having an output communicatively coupled to the processor; a third vector magnetometer wherein the third vector magnetometer corresponds to an cross-borehole axis wherein the third vector magnetometer is adapted to measure a third vector magnetic field component, the third vector magnetometer having an output communicatively coupled to the processor; wherein the first vector magnetometer, the second vector magnetometer, and the third vector magnetometer are affixed to the drill string subassembly; wherein the along-borehole axis is orthogonal to the cross-borehole axis of the second vector magnetometer and the third vector magnetometer, and wherein the cross-borehole axis of the second vector magnetometer is orthogonal to the cross-borehole axis of the third vector magnetometer; wherein the processor is adapted to determine the average total magnetic field value ($B_{TwR}$) as an average of the instantaneous vector magnitudes of the first vector magnetic field component, the second vector magnetic field component, and the third vector magnetic field component.

One example of a method for determining an average cross-axis magnetic field value during drilling comprises: providing a biaxial vector magnetometer affixed to a drill string subassembly wherein the biaxial vector magnetometer is adapted to measure two orthogonal component magnetic fields; allowing the drill string subassembly to rotate; and determining the average cross-axis magnetic field value ($B_{CwR}$) as an average magnitude of the instantaneous vector sum of the two orthogonal component magnetic fields during the step of allowing the drill string subassembly to rotate wherein the total magnetic field value ($B_{CwR}$) is computed according to the formula:

$$B_{CwR} = \sqrt{\frac{\sum_{i=1}^{n}(B_{x_i}^2 + B_{y_i}^2)}{n}},$$

wherein $B_{xi}$ and $B_{yi}$ each correspond to a cross-borehole axis.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein.

Figure 1:
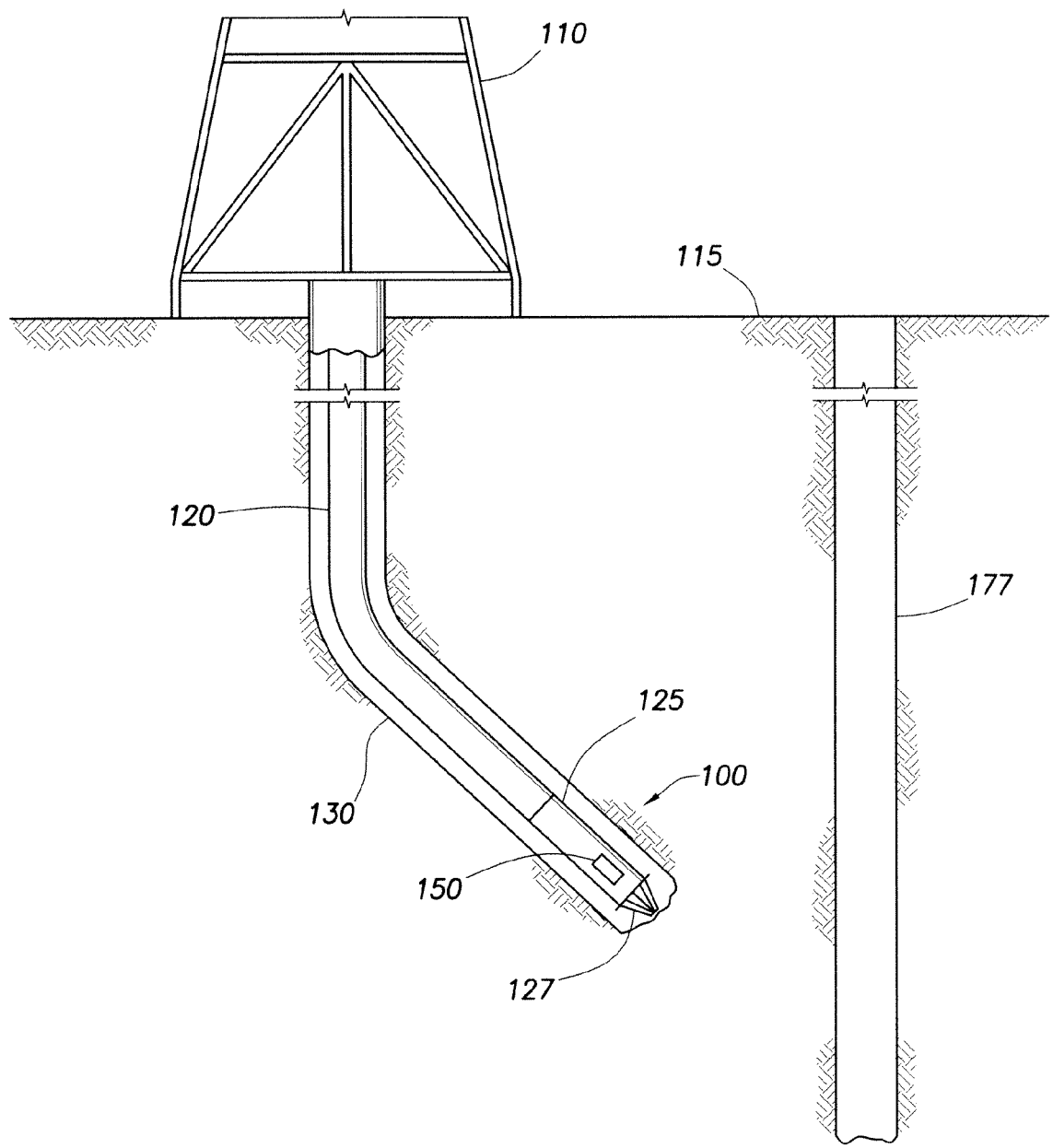
FIG. 1 illustrates a drill string drilling a deviated borehole, the drill string carrying a magnetic field measurement device.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

The present invention relates to downhole magnetic measurement devices and methods, which are capable of being used during drilling. These downhole magnetic measurement devices may be useful for determining downhole tool orientation, well avoidance, well intercept, and verification of instrument integrity.

Methods and systems are provided which allow for the downhole measurement of magnetic fields during drilling. In certain embodiments, a triaxial vector magnetometer is provided and affixed to a drill string subassembly. As its name implies, the triaxial vector magnetometer is adapted to measure three orthogonal component magnetic fields. The drill string subassembly is typically located near the drill bit so as to better approximate the conditions at the drill bit. While the drill string subassembly is rotating as during drilling operations, an average total magnetic field value ($B_{TwR}$) is determined as an average of the instantaneous vector magnitudes of the three orthogonal component magnetic fields. In this way, near-bit estimates of the downhole magnetic field may be obtained and used for a variety of functions.

Additionally, as will be shown below, borehole inclination and/or azimuth may be determined as well from vector magnetometer and accelerometer data. Furthermore, the values calculated herein may be used for well avoidance and well intercept applications. In certain embodiments, the methods and devices herein may yield more accurate determinations of magnetic field values, inclination, and azimuth than conventional methods. Even small improvements in accuracy can have a significant impact on downhole survey and well avoidance/intercept predictions as such calculations tend to compound existing errors over time. Embodiments of the present invention provide other optional features, as explained herein. Also provided are methods for detecting the presence of external ferromagnetic material which may also be used for well avoidance and well intercept applications.

To facilitate a better understanding of the present invention, the following examples of certain embodiments are given. In no way should the following examples be read to limit, or define, the scope of the invention.

Magnetic Field Determinations

FIG. 1 illustrates the drilling of a deviated borehole with a drill string carrying a magnetic field measurement device. More particularly, drilling rig 110 at surface 115 is shown drilling borehole 130. In this simplified diagram, drill string 120 is comprised of numerous sections of pipe and includes bottom hole assembly 125 with drill bit 127.

Device 150 is a downhole tool or measurement instrument package for measuring magnetic field values and is affixed to bottom hole assembly 125. Although device 150 is shown here as specifically affixed to bottom hole assembly 125, device 150 may be affixed to any drill string subassembly. As used herein, the term "drill string subassembly" refers to any section or subassembly of the drill string, including any portion of the bottom hole assembly. As used herein, the term "affixed to" explicitly includes incorporating device 150 within a drill string subassembly, attachment on the surface of a drill string subassembly, or any combination thereof. In certain embodiments, device 150 is affixed near the drill bit in a non-magnetic collar above the mud motor. External ferromagnetic material 177 (e.g. in the form of a second well casing or drill string) is shown in proximity to borehole 130. In certain embodiments, as will be further explained below, device 150 is adapted to detect the presence of such external ferromagnetic material 177.

Figure 2:
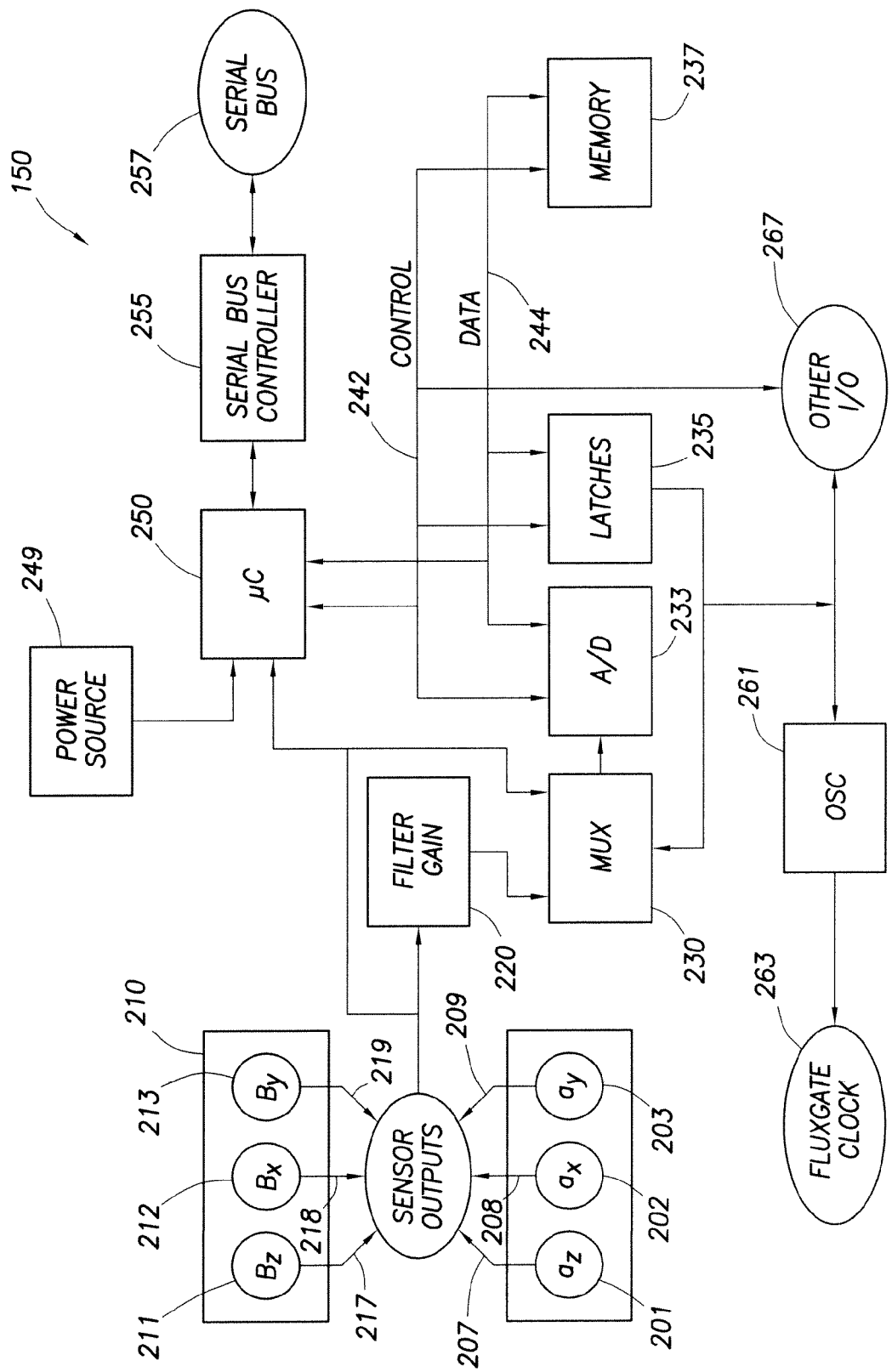
FIG. 2 illustrates a schematic illustration of a magnetic field measurement device in accordance with certain embodiments of the present invention.

FIG. 2 illustrates a schematic illustration of a magnetic field measurement device 150 in accordance with certain embodiments of the present invention. FIG. 2 shows one possible implementation of device 150. As a person of ordinary skill with the benefit of this disclosure would recognize, many of the individual components shown in FIG. 2 are optional.

Triaxial vector magnetometer 210 is adapted to measure three orthogonal component magnetic fields. In this embodiment, triaxial vector magnetometer 210 houses three separate vector magnetometers 211, 212, and 213. In certain embodiments, vector magnetometers 211, 212, and 213 may be integrated into one single sensor. Accordingly, as used herein, the term "triaxial vector magnetometer" refers to triaxial component magnetometers composed of a plurality of independent sensors and triaxial magnetometers wherein the triaxial component measurement functions are integrated into a single sensor.

Accelerometers 201, 202, and 203 provide additional measurement data, which may be used by the methods as needed as provided below. In some cases, one or more of the accelerometers may be an inclinometer.

Sensor outputs 207, 208, 209, 217, 218, and 219 are then transmitted to filter and gain processing unit 220 to provide optional filtering and/or signal gain as desired. It is recognized that the processing provided by filter and gain processing unit 220 may be accomplished by digital circuitry such as by a microprocessor or analog circuitry. Accordingly, in this context, the term processing does not necessarily imply the presence of a processor. Optional oscillator 261 drives fluxgate clock 263, which is in turn used by the fluxgate magnetometers.

Multiplexer 230, analog to digital converter 233, and latching unit 235 along with microprocessor 250 combine to provide processing of sensor outputs 217, 218, and 219. Control bus 242 and data bus 244 provide interconnectivity and functionality for communication among and functioning of the various components shown herein. The particular exact hardware implementation shown here is only one possible implementation and the processing described herein may be accomplished through a variety of hardware implementations as would be recognized by a person of ordinary skill with the benefit of this disclosure. More specifically, microprocessor 250, which is powered by power source 249, determines the average total magnetic field value ($B_{TwR}$) from sensor outputs 217, 218, and 219.

Another possible alternative implementation would be to incorporate a simultaneous sampling analog-to-digital converter that would sample each of the $B_x$, $B_y$, $B_z$ inputs simultaneously rather than in sequence as is shown in the implementation depicted in FIG. 2 with the MUX/single A/D hardware. The advantage of this alternative technique is a removal of the error caused by the samples of $B_x$, $B_y$, $B_z$ being taken at different points in time. This error may be reduced, however, by utilizing a sample rate that is sufficiently high as compared to the maximum rotation rate expected for the application so as to reduce error that results from angular differences between samples.

As used herein, the term "average total magnetic field value" means the average magnitude of the instantaneous vector sum of the three orthogonal component magnetic fields. As used herein, the term "average magnitude of the instantaneous vector sum of the three orthogonal component magnetic fields" means $$B_{TwR} = \frac{\sum_{i=1}^{n} \sqrt{B_{x_i}^2 + B_{y_i}^2 + B_{z_i}^2}}{n} \qquad \text{[Eqn. B1]}$$

or any substantial mathematical equivalent thereto. Here, $B_{xi}$, $B_{yi}$, and $B_{zi}$ each correspond to one of the three orthogonal component magnetic fields. Typically, $B_{zi}$ is used to denote the component magnetic field corresponding to the along-borehole axis whereas $B_{xi}$ and $B_{yi}$ typically refer to cross-borehole component magnetic fields. Suitable examples of substantial mathematical equivalents to an average of the instantaneous vector magnitudes of the three orthogonal component magnetic fields include, but are not limited to, $$B_{TwR} = \sqrt{\frac{\sum_{i=1}^{n}(B_{xi}^2 + B_{yi}^2)}{n} + \left(\frac{\sum_{i=1}^{n} B_{zi}}{n}\right)^2}, \qquad \text{[Eqn. B2]}$$

$$B_{TwR} = \sqrt{\frac{\sum_{i=1}^{n}(B_{x_i}^2 + B_{y_i}^2 + B_{z_i}^2)}{n}}, \qquad \text{[Eqn. B3]}$$

or any mathematical function that yields a substantially similar output over a desired range of interest. Equation B3 may be preferable in some embodiments, because this equation necessitates calculating the square root only once instead of multiple times. It is recognized that Equation B1 and Equation B3 are not exactly equal, except when $B_{xi}^2+B_{yi}^2+B_{zi}^2$ is equal for each i. Differences in these individual summed/square root values will result in a different error value depending on the order of the sum and sqrt functions. Simulations have shown Eqn. B1 to be slightly more accurate with respect to random noise on samples of $B_{xi}$, $B_{yi}$, and $B_{zi}$ than Eqn. B3. The formulation of Equation B2 has the advantage that random zero mean noise on samples of $B_z$ will average to 0 making this calculation less sensitive to random noise. In certain embodiments, only two magnetometers may be used to calculate the average cross-axis magnetic field value. In such cases, the equation $$B_{CwR} = \sqrt{\frac{\sum_{i=1}^{n}(B_{x_i}^2 + B_{y_i}^2)}{n}} \qquad \text{[Eqn. B4]}$$

may be used or any substantial mathematical equivalent thereto. As before, it is recognized that a biaxial magnetometer may be comprised of two independent sensors or may be comprised of a single sensor that integrates the functions of two independent sensors into a single sensor.

These computation may be accomplished while the drill string subassembly is rotating, as during drilling. Accordingly, these algorithms enable the accurate computation of the average total magnetic field and average cross-axis magnetic field during drilling. In this way, by placing device 150 in or on a rotating portion of a drill string, an average total magnetic field and average cross-axis magnetic field may be determined for the portion of the drill string in proximity to the drill bit.

Vector magnetometers 211, 212, and 213 should have a sufficiently high bandwidth such that no significant signal attenuation results at the maximum expected rotation rate.

A clock internal to microprocessor 250 provides date and time-stamps for measured and calculated data stored in memory 237. In certain embodiments, memory 237 may comprise flash memory. Measured and calculated data may also be communicated to serial bus 257 via serial bus controller 255 for communication to a surface computer or use by other sensors and/or tools. Communication of this data to a surface computer may be accomplished by use of wireline, wired pipe, mud-pulse mwd, electromagnetic mwd, or other downhole wireless telemetry methods such as acoustic telemetry, or any combination thereof.

Magnetic Angle Determinations

Device 150 may be further adapted to determine the angle between the axis of the borehole and the Earth's magnetic field vector, hereafter referred to as $B_{Angle}(\theta)$. In particular, microprocessor 250 may be adapted to determine a calculated $B_{Angle}(\theta)$ of the drill string subassembly according to the formula $$\theta = \cos^{-1}\left(\frac{B_z}{B_{TwR}}\right) \quad \text{[Eqn. T1]}$$

or substantial mathematical equivalent thereto, where $B_z$ refers to the along-borehole axis vector component magnetic field ($B_z$). In this way, the $B_{Angle}$ of a drill string subassembly may be used to estimate for changes in borehole direction, and as an indication of nearby ferromagnetic material during drilling operations.

Azimuth Determinations

Device 150 may be further adapted to determine a calculated azimuth of the drill string subassembly. Once an inclination is determined by an independent sensor such as an inclinometer, a calculated magnetic azimuth Azm may be determined by microprocessor 250. In particular, the formula $$Azm = a\text{Cos}\left(\frac{\cos(B_{Angle}) - \sin(Dip)*\cos(Inc)}{\cos(Dip)*\sin(Inc)}\right) \quad \text{[Eqn. A1]}$$

may be used, wherein inc is an inclinometer measurement, wherein $B_{Angle}(\theta)$ is determined according to Eqn. T1, and wherein Dip is the dip angle, that is, the inclination from horizontal of the Earth's magnetic field. The inclinometer measurement should be nearly time coincident with the magnetometer measurements used to determine $B_{Angle}(\theta)$ to avoid error due to inclination change over time. The dip angle can be determined from a geomagnetic model or from a stationary measurement using magnetometers and accelerometers. The sign of the Azm so determined may be either positive or negative and must be selected based on previous surveys taken while stationary. Additionally, a substantial mathematical equivalent of Eqn. A1 may alternatively be used to arrive at a substantially similar value.

Detection of External Ferromagnetic Material

Device 150 may also be further adapted to detect the presence of external ferromagnetic material during drilling. Detecting the presence of external ferromagnetic material, such as another well casings or another drill string, is particularly useful for well avoidance and well intercept applications. In certain embodiments, methods for detecting the presence of external ferromagnetic material during drilling comprise: determining a plurality of average total magnetic fields along a section of borehole being drilled and identifying the presence of external ferromagnetic material as a portion of the section where the average total magnetic field varies from an expected Earth's magnetic field. Again, as used herein the term "average total magnetic field" means an average magnitude of the instantaneous vector sum of the three orthogonal component magnetic fields, which may be estimated by any of the foregoing methods described herein. This adaptation also includes using only some of the components of the average total magnetic field including at least one of $B_{TwR}$, $B_{CwR}$, and $B_z$.

The term "expected Earth's magnetic field" is the value for the Earth's magnetic field in absence of any external ferromagnetic material. This value may be determined by a variety of methods, including, but not limited to, measuring the Earth's magnetic field in a section of borehole known to be out of range of any external ferromagnetic material. Alternatively, this value may be inferred from a mathematical model of the geomagnetic field, a measurement on the surface, or any combination thereof.

In addition to determining the presence of external ferromagnetic material, distances to external ferromagnetic material may also be estimated. Methods for estimating distances to external ferromagnetic material comprise determining the amplitude and spatial frequency of the difference between the expected Earth's magnetic filed and the average total magnetic field value ($B_{TwR}$) over a section of borehole and comparing the amplitude and spatial frequency of a $B_{TwR}$ difference signal to an amplitude and spatial frequency of an expected difference signal from an assumed source at an assumed distance. The expected difference signal may be estimated from theoretical data from a computer model. In general, the $B_{TwR}$ difference signal may be determined by subtracting the earth's total magnetic field from the $B_{TwR}$ signal.

The amplitude and spatial frequency is characteristic of the distance to the source of the interference, which may be a well casing or another drill string. By comparing the amplitude and spatial frequency of the measured $B_{TwR}$ difference signal to the expected difference signal from an assumed source at an assumed distance, one can estimate the distance to the external ferromagnetic material as the distance that corresponds to an assumed source and distance which produces the same amplitude and spatial frequency. Accordingly, this estimated distance may be used for well avoidance or well intercept as desired.

Instrument Integrity Verification

The average total magnetic field ($B_{TwR}$) that is calculated during drilling may also be used for verification of instrument integrity. An average total magnetic field ($B_{TwR}$) may be calculated as before during drilling. This value may then be compared to the stationary magnetic field measurements. One may compare the average total magnetic field ($B_{TwR}$) to the stationary total magnetic field measurement so as to determine a magnitude of error between the total magnetic field ($B_{TwR}$) and the stationary total magnetic field measurement. If the values diverge in the absence of external ferromagnetic material, one may infer that an instrument problem exists.

In certain embodiments, the step of measuring a stationary total magnetic field may be accomplished by measuring the stationary total magnetic field by an independent magnetic field instrumentation while the drill string subassembly is stationary. In other embodiments, the step of measuring a stationary total magnetic field may be accomplished by measuring the stationary total magnetic field with the triaxial vector magnetometer while the drill string subassembly is stationary.

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

EXAMPLES

To facilitate a better understanding of the present invention, the following examples of certain aspects of some embodiments are given. In no way should the following examples be read to limit, or define, the scope of the invention.

An MWD instrument modified to record $B_{TwR}$ was run in a borehole in combination with a standard MWD instrument. The measured values of $B_{TwR}$ were recorded while drilling ahead. Stationary values were then taken every 2 feet along the borehole without rotation of the drillstring and matched the $B_{TwR}$ data points. The $B_z$ values from the two different instruments were adjusted to compensate for the magnetic interference due to differing positions in the drillstring.

Figure 3:
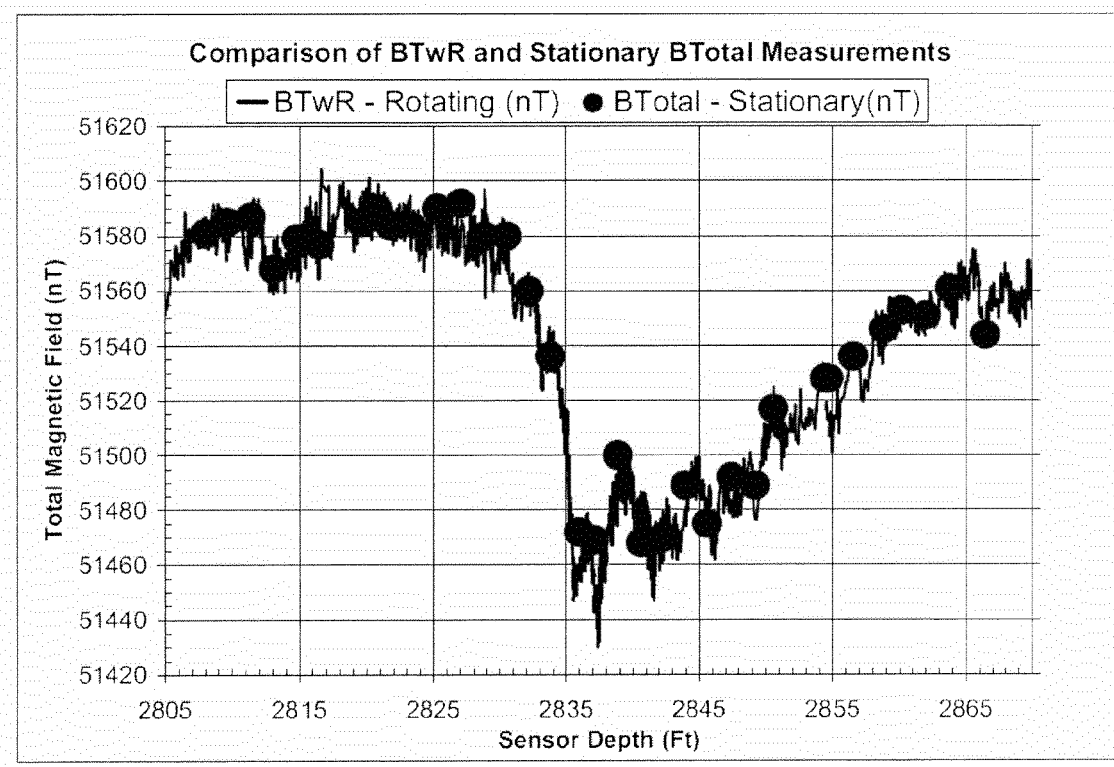
FIG. 3 shows a comparison of measurements of total magnetic field taken while rotating and while stationary.

FIG. 3 shows a comparison of $B_{TwR}$ data recorded while rotating ahead with stationary $B_{total}$ values acquired with a standard MWD instrument (depth adjusted). The $B_{TwR}$ instrument was located about 6 feet below the MWD. Thus, as shown by the data in FIG. 3, calculated values of $B_{TwR}$ during drilling correlate quite well with $B_{total}$ values acquired with a standard MWD instrument while stationary, demonstrating the efficacy of certain embodiments of the present invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A method for determining an average total magnetic field value during drilling comprising:
    providing a triaxial vector magnetometer affixed to a drill string subassembly wherein the triaxial vector magnetometer is adapted to measure three orthogonal component magnetic fields;
    allowing the drill string subassembly to rotate; and
    determining the average total magnetic field value ($B_{TwR}$) during the step of allowing the drill string subassembly to rotate, wherein the total magnetic field value ($B_{TwR}$) is computed according to a formula selected from the group consisting of:

$$B_{TwR} = \frac{\sum_{i=1}^{n} \sqrt{B_{x_i}^2 + B_{y_i}^2 + B_{z_i}^2}}{n};$$

$$B_{TwR} = \sqrt{\frac{\sum_{i=1}^{n}(B_{x_i}^2 + B_{y_i}^2)}{n} + \left(\frac{\sum_{i=1}^{n} B_{z_i}}{n}\right)^2}; \text{ and}$$

$$\sqrt{\frac{\sum_{i=1}^{n}(B_{x_i}^2 + B_{y_i}^2 + B_{z_i}^2)}{n}},$$

wherein $B_{xi}$, $B_{yi}$, and $B_{zi}$ each correspond to one of the three orthogonal component magnetic fields.

2. The method of claim 1 wherein the triaxial magnetometer comprises three vector magnetometers.

3. The method of claim 1 wherein $B_{zi}$ corresponds to an along-borehole axis and wherein $B_{xi}$, and $B_{yi}$ correspond to cross-borehole axis.

4. The method of claim 1 wherein the three vector magnetometers are of a sufficiently high bandwidth such that there is no significant signal attenuation at the maximum expected rotation rate.

5. The method of claim 1 further comprising:
    determining an along-borehole axis vector component magnetic field ($B_z$); and
    determining a calculated $B_{Angle}(\theta)$ of the drill string subassembly according to the formula $$\theta = \cos^{-1}\left(\frac{B_z}{B_{TwR}}\right).$$

6. The method of claim 1 further comprising:
    determining an along-borehole axis vector component magnetic field value ($B_z$); and
    determining a calculated $B_{Angle}(\theta)$ of the drill string subassembly according to the formula $$\theta = \cos^{-1}\left(\frac{B_z}{B_{TwR}}\right).$$

7. The method of claim 1 further comprising:
    ceasing temporarily rotation of the drill string subassembly;
    measuring an inclination and an azimuth of the drill string subassembly while the drill string subassembly is stationary so as to determine an initial stationary azimuth and the inclination;
    allowing the drill string subassembly to rotate during drilling; and determining a calculated azimuth (Azm) during drilling according to the formula $$Azm = aCos\left(\frac{\cos(B_{Angle}) - \sin(Dip) * \cos(Inc)}{\cos(Dip) * \sin(Inc)}\right)$$

wherein Inc is the inclination during drilling, wherein Dip is an inclination from horizontal of the Earth's magnetic field, and wherein $B_{Angle}$ is the calculated $B_{Angle}$ ($\theta$).

8. The method of claim 7 further comprising avoiding a well collision using the calculated Azm to determine a borehole direction.

9. The method of claim 7 further comprising intercepting a well using the calculated Azm to determine a borehole direction.

10. The method of claim 7 further comprising using the calculated $B_{Angle}(\theta)$ and the calculated Azm for one of: well collision avoidance and well intercept.

11. The method of claim 7 further comprising the step of outputting a value wherein the value is selected from the group consisting of: the $B_{TwR}$, the calculated $B_{AngleI}(\theta)$, a calculated inclination, and the calculated Azm, wherein the step of outputting is selected from the group consisting of: storing the value in a memory and transmitting the value to a surface computer.

12. The method of claim 1 further comprising:
providing an inclinometer affixed to the drill string subassembly;
measuring an inclination using an inclinometer;
ceasing temporarily rotation of the drill string subassembly;
measuring an azimuth of the drill string subassembly while the drill string subassembly is stationary so as to determine an initial stationary azimuth;
allowing the drill string subassembly to rotate during drilling; and
determining a calculated azimuth during drilling according to the formula $$Azm = aCos\left(\frac{\cos(B_{Angle}) - \sin(Dip) * \cos(Inc)}{\cos(Dip) * \sin(Inc)}\right),$$

where Inc is the inclination and Dip is an inclination from horizontal of the Earth's magnetic field.

13. A method for detecting a presence of external ferromagnetic material comprising:
providing a triaxial vector magnetometer affixed to a drill string subassembly wherein the triaxial magnetometer is adapted to measure three orthogonal component magnetic fields;
allowing the drill string subassembly to rotate;
drilling a section of borehole;
determining a plurality of average total magnetic fields along the section of borehole wherein the total magnetic field value ($B_{TwR}$) is computed according to a formula selected from the group consisting of:

$$B_{TwR} = \frac{\sum_{i=1}^{n}\sqrt{B_{x_i}^2 + B_{y_i}^2 + B_{z_i}^2}}{n};$$

$$B_{TwR} = \sqrt{\frac{\sum_{i=1}^{n}(B_{x_i}^2 + B_{y_i}^2)}{n} + \left(\frac{\sum_{i=1}^{n} B_{z_i}}{n}\right)^2}; \text{ and } \sqrt{\frac{\sum_{i=1}^{n}(B_{x_i}^2 + B_{y_i}^2 + B_{z_i}^2)}{n}},$$

wherein $B_{xi}$, $B_{yi}$, and $B_{zi}$ each correspond to one of the three orthogonal component magnetic fields during the step of allowing the drill string subassembly to rotate; and
identifying the presence of external ferromagnetic material as a portion of the section where the average total magnetic fields vary from an expected Earth's magnetic field.

14. The method of claim 13 wherein the expected Earth's magnetic field is determined as a stationary magnetic field in absence of any external ferromagnetic material.

15. The method of claim 13 further comprising:
determining an amplitude and spatial frequency of a difference between an the expected earth's total magnetic field and the average total magnetic field value ($B_{TwR}$) over the section of borehole;
comparing an amplitude and spatial frequency of a $B_{TwR}$ difference signal to an amplitude and spatial frequency of an expected difference signal from an assumed source at an assumed distance so as to produce a comparison wherein the expected difference signal is estimated theoretical data from a computer model; and
estimating a distance to external ferromagnetic matter corresponding to the distance where the amplitude and spatial frequency of the $B_{TwR}$ measured difference signal is substantially similar to the expected difference signal.

16. The method of claim 15 wherein the step of estimating the distance is used for one of: well collision avoidance and well intercept.

17. A method for assessing the operational quality of downhole instrumentation comprising:
providing a triaxial vector magnetometer affixed to a drill string subassembly wherein the triaxial vector magnetometer is adapted to measure three orthogonal component magnetic fields;
allowing the drill string subassembly to rotate;
determining an average total magnetic field ($B_{TwR}$) during the step of allowing the drill string subassembly to rotate wherein the total magnetic field value ($B_{TwR}$) is computed according to a formula selected from the group consisting of:

$$B_{TwR} = \frac{\sum_{i=1}^{n}\sqrt{B_{x_i}^2 + B_{y_i}^2 + B_{z_i}^2}}{n};$$

$$B_{TwR} = \sqrt{\frac{\sum_{i=1}^{n}(B_{x_i}^2 + B_{y_i}^2)}{n} + \left(\frac{\sum_{i=1}^{n} B_{z_i}}{n}\right)^2}; \text{ and } \sqrt{\frac{\sum_{i=1}^{n}(B_{x_i}^2 + B_{y_i}^2 + B_{z_i}^2)}{n}},$$

wherein $B_{xi}$, $B_{yi}$, and $B_{zi}$ each correspond to one of the three orthogonal component magnetic fields;
ceasing temporarily rotation of the drill string subassembly;

measuring a stationary total magnetic field while the drill string subassembly is stationary so as to produce a stationary total magnetic field measurement; and comparing the average total magnetic field ($B_{T_{wR}}$) to the stationary total magnetic field measurement so as to determine a magnitude of error between the total magnetic field ($B_{T_{wR}}$) and the stationary total magnetic field measurement.

18. The method of claim 17 wherein the step of measuring a stationary total magnetic field comprises measuring the stationary total magnetic field by an independent magnetic field instrumentation while the drill string subassembly is stationary so as to produce a stationary total magnetic field measurement.

19. The method of claim 17 wherein the step of measuring a stationary total magnetic field comprises measuring the stationary total magnetic field by the triaxial vector magnetometer while the drill string subassembly is stationary so as to produce a stationary total magnetic field measurement.

20. The method of claim 17 wherein the step of determining an average total magnetic field ($B_{T_{wR}}$) occurs substantially in absence of a presence of external ferromagnetic material.

\* \* \* \* \*